United States Patent [19]

Uchiyama et al.

[11] Patent Number: 4,751,158

[45] Date of Patent: Jun. 14, 1988

[54] AMORPHOUS CATHODE MATERIAL FOR USE IN LITHIUM ELECTROCHEMICAL CELL AND LITHIUM ELECTROCHEMICAL CELL INCLUDING THE AMORPHOUS CATHODE MATERIAL

[75] Inventors: Michelle C. Uchiyama, Somerset; Steven M. Slane, Neptune, both of N.J.

[73] Assignee: The United States of America as represented by the Secretary of the Army, Washington, D.C.

[21] Appl. No.: 82,776

[22] Filed: Aug. 3, 1987

[51] Int. Cl.$^4$ .................... H01M 4/02; H01M 6/16
[52] U.S. Cl. .................... 429/194; 429/218; 252/182.1
[58] Field of Search ............ 429/218, 194, 232, 217; 252/518, 500, 182.1; 423/593, 606

[56] References Cited

U.S. PATENT DOCUMENTS

| | | | |
|---|---|---|---|
| 4,119,771 | 10/1978 | Saridakis | 429/178 |
| 4,233,375 | 11/1980 | Whittingham et al. | 429/194 |
| 4,310,609 | 1/1982 | Liang et al. | 429/194 |
| 4,675,260 | 6/1987 | Sakurai et al. | 429/196 X |

*Primary Examiner*—Anthony Skapars
*Attorney, Agent, or Firm*—Sheldon Kanars; Roy E. Gordon

[57] ABSTRACT

A cathode is provided for use in a lithium electrochemical cell including a cathode mix of amorphous materials from the mixed metal oxide $(V_{0.7}Mo_{0.3})_2O_5$ and $P_2O_5$ as the cathode active material, combined with a mixture of conductive diluent and binder and pressed into electrodes on a nickel screen and sintered under vacuum at about 280° C.

8 Claims, No Drawings

AMORPHOUS CATHODE MATERIAL FOR USE IN LITHIUM ELECTROCHEMICAL CELL AND LITHIUM ELECTROCHEMICAL CELL INCLUDING THE AMORPHOUS CATHODE MATERIAL

The invention described herein may be manufactured, used, and licensed by or for the Government for governmental purposes without the payment to us of any royalty thereon.

This invention relates in general to a cathode for use in a lithium electrochemical cell and in particular to such a cathode including a cathode mix of amorphous materials from the mixed metal oxide $(V_{0.7}Mo_{0.3})_2O_5$ and $P_2O_5$ as the cathode active material.

BACKGROUND OF THE INVENTION

This application is copending with U.S. patent application Ser. No. 059,346 filed June 8, 1987, for "Cathode Material For Use In Lithium Electrochemical Cell And Lithium Electrochemical Cell Including Said Cathode Material" by Michelle C. Uchiyama, Steven M. Slane, and Mark A. Salamon, and assigned to a common assignee. In that application, there is disclosed a cathode for use in a lithium electrochemical cell in which the cathode active material includes the mixed-metal oxide $V_9Mo_6O_{40}$ and solid solutions of it with $V_2O_5$ or $MoO_3$. Though the approach of using a mixed metal oxide as in U.S. patent application Ser. No. 059,346 stabilizes the structure of the cathode material during the discharge of the lithium electrochemical cell, it would be desirable to achieve an even greater stability, that is, to be able to discharge the lithium electrochemical cell to even lower voltages thus increasing the capacity of the cell.

SUMMARY OF THE INVENTION

The general object of this invention is to provide an improved cathode for use in a lithium electrochemical cell. A more specific object of the invention is to provide an inexpensive high energy material with excellent cycle-life and rate capabilities for use as the cathode of a lithium electrochemical cell. A specific object of the invention is to provide a cathode for use in a lithium electrochemical cell that will be capable of discharging the cell to even lower voltages than were obtained with the cathode of U.S. patent application Ser. No. 059,346.

It has now been found that amorphous materials prepared from the mixed-metal oxide $(V_{0.7}Mo_{0.3})_2O_5$ and $P_2O_5$ when used as the cathode active material, exhibit excellent capacities on extended cycling in lithium electrochemical cells.

The amorphous mixed-metal oxides $(V_{0.7}Mo_{0.3})_2O_5$ with various weight percentages of $P_2O_5$ offer any advantages over currently available cathode active materials such as $V_2O_5$ or $(V_{0.7}Mo_{0.3})_2O_5$. In particular, cathodes made with these materials can achieve very high energy densities. For example, an experimental energy density of 715 Wh/kg (based on active materials) is obtained with 90 weight percent $(V_{0.7}Mo_{0.3})_2O_5$-10 weight percent $P_2O_5$ at a discharge current density of 2.0 mA/cm$^2$. This exceeds the theoretical energy densities of 606 Wh/kg for $(V_{0.7}Mo_{0.3})_2O_5$, 409 Wh/kg for $V_2O_5$ and 490 Wh/kg for $TiS_2$. It is noted in this connection that theoretical capacities are never realized experimentally. Cathodes prepared from the glassy material $(V_{0.7}Mo_{0.3})_2O_5 \cdot P_2O_5$ also display minimal losses in capacity upon extended cycling, and can be reversibly recycled to lower potentials than the parent oxides $V_2O_5$ or $(V_{0.7}Mo_{0.3})_2O_5$. An additional advantage of these new cathodes is that they can reversibly handle higher current densities on extended cycling than the parent oxides. $Li/V_2O_5$ and $Li/(V_{0.7}Mo_{0.3})_2O_5$ are reported to cycle reversibly for maximum discharge/charge current densities of 1.0 and 0.5 mA/cm$^2$, respectively.

The new cathode will be used in lithium electrochemical systems for man-portable electronic and communication equipment as well as general portable devices requiring battery power sources.

The class of lithium intercalating transition metal oxides are particularly attractive for this purpose because of their tendency to possess high energy content. However, the known oxides are either expensive to prepare as is the case of vanadium oxide or they are electronic insulators thereby preventing their use for high current applications. Another difficulty with transition metal oxides, especially $V_2O_5$, is susceptibility to overdischarge which results in solvent and electrolyte decomposition and in structural rearrangement with severe losses in cell capacity and cycle-life.

The present invention is directed to a new amorphous mixed-metal oxide of vanadium and molybdenum, with the network former, $P_2O_5$. The new glassy materials include a mixture of $(V_{0.7}Mo_{0.3})_2O_5$ with $\leq 20$ weight percent $P_2O_5$. These mixtures are heated until molten and then rapidly quenched, resulting in an amorphous structure. Use of these materials in cathodes for lithum batteries results in an inexpensive, high-energy, high rate cathode with good cycle life. In addition, cathodes prepared from $(V_{0.7}Mo_{0.3})_2O_5$ with $P_2O_5$ are less susceptible to overdischarge and possess higher capacity and greater rate capabilities than the parent oxides $(V_{0.7}Mo_{0.3})_2O_5$ or $V_2O_5$.

$(V_{0.7}Mo_{0.3})_2O_5$ is prepared by combination of stoichiometric quantities of $V_2O_5$, $MoO_3$ and V, high temperature firing in evacuated quartz tubes, followed by rapid quenching to assure small particle size. The $(V_{0.7}Mo_{0.3})_2O_5$ so obtained is combined with an appropriate weight percent of $P_2O_5$, ranging from 1 to 20 weight percent, under an inert atmosphere. These mixtures are heated under an argon atmosphere until molten and then rapidly quenched, resulting in an amorphous structure. The $(V_{0.7}Mo_{0.3})_2O_5$ $P_2O_5$ glasses are ground to powder form for use in cathodes.

A cathode mix of 70 weight percent active material such as, $(V_{0.7}Mo_{0.3})_2O_5 \cdot P_2O_5$, 18 weight percent conductive diluent such as Shawinigan Acetylene Black, and 12 weight percent binder such as Teflon is used to prepare cathodes. The weight percent of conductive diluent may range from 0 to 30 percent and the weight percent of binder may range from 1 to 30 percent. Other conductive diluents such as high surface area carbons, graphites, or other conductive materials may be used. In addition, other binders such as polyolefins or elastomers may be substitutes for Teflon. The weight percent of active materials may range from 40 to 99 percent. When any component of the cathode mix is changed, the concentrations of the remaining components may be adjusted accordingly.

DESCRIPTION OF THE PREFERRED EMBODIMENT

A 60 weight percent/40 weight percent Shawinigan Acetylene Black/Teflon mix is prepared from an aqueous Teflon emulsion. The mixture is then sintered under vacuum at 280° C. and then ground into a fine powder.

The active material, $(V_{0.7}Mo_{0.3})_2O_5 \cdot P_2O_5$ is then combined with the 60/40 weight percent Shawinigan Acetylene Black/Teflon mixture in appropriate amounts to yield the desired weight percentages of each component in the cathode. This final mixture is pressed into flat electrodes on an Exmet nickel screen at a pressure of 1400 p.s.i. The electrodes are sintered under vacuum at 280° C., cooled to room temperature and pressed again at 1400 p.s.i.

The experimental laboratory test cells include a wick cell configuration utilizing flag electrodes in a pressure reaction vessel. A lithium anode on each side of the cathode is separated by a porous fiber separator or wick. The electrodes are sealed in polypropylene separator material. Laboratory test cells are equipped with a lithium reference electrode which is unnecessary in practical configurations.

Cathodes prepared as described in the preferred embodiment are utilized in cathode-limited lithium cells with 2.0 molar $LiAsF_6$ in methyl formate electrolyte. Other stable electrolyte systems including ethers, esters and carbonates may be substituted for $LiAsF_6$ in methyl formate. These cells exhibit high experimental energy densities as based on active material, ranging from 783 Wh/kg on the first cycle to 350 Wh/kg on the fiftieth cycle.

Cells employing cathodes prepared from the amorphous $(V_{0.7}Mo_{0.3})_2O_5 P_2O_5$ material possess superior capacity retention upon extended cycling for the second and subsequent cycles than cells utilizing the parent oxide $(V_{0.7}Mo_{0.3})_2O_5$. In addition, higher experimental energy densities are obtained on the ninth and subsequent cycles with the $(V_{0.7}Mo_{0.3})_2O_5 P_2O_5$ at a current density of 1.0 mA/cm$^2$. This capacity advantage is significantly more apparent at higher discharge current densities of 2.0 mA/cm$^2$. Cells employing the $(V_{0.7}Mo_{0.3})_2O_5 P_2O_5$ cathode have been reversibly cycled at discharge current densities of 5.0 mA/cm$^2$ although lower capacities and somewhat poorer capacity retention upon extended cycling is observed.

An additional advantage of the new amorphous cathode material $(V_{0.7}Mo_{0.3})_2O_5 P_2O_5$ is that it is less susceptible to over-discharge than the parent oxides $(V_{0.7}Mo_{0.3})_2O_5$ or $V_2O_5$. Cells utilizing $(V_{0.7}Mo_{0.3})_2O_5 P_2O_5$ cathodes can be reversibly cycled to cut-off potentials as low as 1.5 V vs. Li as compared to 1.9 V for $(V_{0.7}Mo_{0.3})_2O_5$ or 2.5 V for $V_2O_5$. Thus, greater resistance to overdischarge within the same voltage range as the parent oxides, is obtainable with the amorphous $P_2O_5$ glasses albeit at lower capacities.

Then too, use of the new mixed-metal oxide glass, $(V_{0.7}Mo_{0.3})_2O_5 P_2O_5$ in cathodes represents a significant advance over the currently available $V_2O_5 P_2O_5$ amorphous cathode. Not only can the new mixed-metal oxide glass $(V_{0.7}Mo_{0.3})_2O_5 P_2O_5$ be reversibly cycled to lower potentials (1.5 V vs 1.9 V) resulting in significantly higher capacities than reported for $V_2O_5 \cdot P_2O_5$, it can also be cycled at higher current densities.

The electrochemical cells of this invention can be used as either a rechargeable system or a primary system.

We wish it to be understood that we do not desire to be limited to the exact details of construction shown and described for obvious modifications will occur to a person skilled in the art.

What is claimed is:

1. A cathode for use in a lithium electrochemical cell comprising a cathode mix of amorphous materials prepared from the mixed-metal oxide $(V_{0.7}Mo_{0.3})_2O_5$ and $P_2O_5$ combined with a mixture of conductive diluent and binder and pressed into electrodes on a nickel screen and sintered under vacuum at about 280° C.

2. A cathode according to claim 1 wherein the cathode active material amounts to about 40 to 99 percent by weight of the cathode, the conductive diluent amounts from 0 to about 30 percent by weight of the cathode, and the binder amounts from about 1 to about 30 percent by weight of the cathode.

3. A cathode according to claim 2 wherein the cathode active material is amorphous $(V_{0.7}Mo_{0.3})_2O_5 P_2O_5$, the conductive diluent is Shawinigan Acetylene Black, and the binder is an aqueous Teflon emulsion.

4. A cathode for use in a lithium electrochemical cell comprising a cathode mix of about 70 weight percent of amorphous $(V_{0.7}Mo_{0.3})_2O_5 P_2O_5$ as the cathode active material combined with a mixture of about 18 weight percent of Shawinigan Acetylene Black and about 12 weight percent of aqueous Teflon emulsion and pressed into flat electrodes on an Exmet nickel screen and sintered under vacuum at about 280° C.

5. A lithium electrochemical cell comprising lithium as the anode, a cathode mix of amorphous materials prepared from the mixed-metal oxide $(V_{0.7}Mo_{0.3})_2O_5$ and $P_2O_5$ as the cathode active material combined with a mixture of conductive diluent and binder and pressed into electrodes on a nickel screen and sintered under vacuum at about 280° C. as the cathode, and a solution of a lithium salt in an aprotic solvent as the electrolyte.

6. A lithium electrochemical cell according to claim 5 wherein the cathode active material amounts to about 40 to 99 percent by weight of the cathode, the conductive diluent amounts from 0 to about 30 percent by weight of the cathode, and the binder amounts from about 1 to about 30 percent by weight of the cathode.

7. A lithium electrochemical cell according to claim 6 wherein the cathode active material is amorphous $(V_{0.7}Mo_{0.3})_2O_5 P_2O_5$, the conductive diluent is Shawinigan Acetylene Black and the binder is an aqueous Teflon emulsion.

8. A lithium electrochemical cell comprising lithium as the anode, a cathode mix of about 70 weight percent of amorphous $(V_{0.7}Mo_{0.3})_2O_5 P_2O_5$ as the cathode active material combined with a mixture of about 18 weight percent of Shawinigan Acetylene Black and about 12 weight percent of aqueous Teflon emulsion and pressed into flat electrodes on an Exmet nickel screen and sintered under vacuum at about 280° C. as the cathode, and a solution of 2.0 molar $LiAsF_6$ in methyl formate as the electrolyte.

* * * * *